(12) United States Patent
Landvogt et al.

(10) Patent No.: US 11,951,555 B2
(45) Date of Patent: Apr. 9, 2024

(54) PROCESS FOR MACHINING A GEAR WORKPIECE, AND CORRESPONDING PAIR OF GEARS

(71) Applicant: Klingelnberg AG, Zurich (CH)

(72) Inventors: Alexander Landvogt, Rheinstetten-Mörsch (DE); Rolf Schalaster, Wermelskirchen (DE); Hartmuth Müller, Remscheid (DE); Carsten Hünecke, Hessisch Oldendorf (DE)

(73) Assignee: KLINGELNBERG AG, Zurich (CH)

( * ) Notice: Subject to any disclaimer, the term of this patent is extended or adjusted under 35 U.S.C. 154(b) by 766 days.

(21) Appl. No.: 16/498,470

(22) PCT Filed: May 18, 2017

(86) PCT No.: PCT/EP2017/061981
§ 371 (c)(1),
(2) Date: Sep. 27, 2019

(87) PCT Pub. No.: WO2018/177563
PCT Pub. Date: Oct. 4, 2018

(65) Prior Publication Data
US 2020/0332877 A1   Oct. 22, 2020

(30) Foreign Application Priority Data
Mar. 28, 2017   (EP) .................................... 17163387

(51) Int. Cl.
*B23F 9/02*   (2006.01)
*B23F 1/02*   (2006.01)

(52) U.S. Cl.
CPC . *B23F 9/02* (2013.01); *B23F 1/02* (2013.01)

(58) Field of Classification Search
CPC ..................................... B23F 1/02; B23F 9/02
See application file for complete search history.

(56) References Cited

U.S. PATENT DOCUMENTS 7,462,092 B2 * 12/2008  Stadtfeld ................. B23F 19/00
                                                    451/147
2013/0216321 A1 *  8/2013  Heer ..................... F16H 55/088
                                                    409/2

(Continued)

FOREIGN PATENT DOCUMENTS

DE    3826029 A1    2/1990
EP    0353451 A2 *  2/1990  ........... B23F 17/008
EP    0890144 B1    5/2002

(Continued)

OTHER PUBLICATIONS

Machine translation of EP0353451A2 (Year: 1990).*

(Continued)

*Primary Examiner* — Kyle A Cook
(74) *Attorney, Agent, or Firm* — McCarter & English, LLP (57) ABSTRACT

The present disclosure relates to a process for machining a gear workpiece (100) comprising a plurality of tooth spaces (6), each of which is defined by two tooth flanks (5.1, 5.2); in said process, a gear tooth-forming tool (1) is used in order to provide at least one subset of all the tooth flanks (5.1, 5.2) with a non-periodically distributed modification of the flank geometry.

10 Claims, 5 Drawing Sheets

(56) References Cited

U.S. PATENT DOCUMENTS

2015/0286206 A1\* 10/2015 Müller ............... B23F 23/1218
                                                                                700/164
2018/0126471 A1\* 5/2018 Strunk ..................... B23F 5/02

FOREIGN PATENT DOCUMENTS

| EP | 1600236 A1 | 11/2005 |
|---|---|---|
| WO | 2016191509 A1 | 12/2016 |

OTHER PUBLICATIONS

Written Opinion for Application No. PCT/EP2017/061981, dated Jan. 5, 2018, 6 pages.
International Search Report for Application No. PCT/EP2017/061981, dated Jan. 5, 2018, 3 pages.

\* cited by examiner

PROCESS FOR MACHINING A GEAR WORKPIECE, AND CORRESPONDING PAIR OF GEARS

CROSS-REFERENCE TO RELATED APPLICATIONS

This application is a national stage application of international application no. PCT/EP2017/061981 filed May 18, 2017, entitled "METHOD FOR MACHINING A GEAR WHEEL WORKPIECE AND CORRESPONDING GEAR WHEEL PAIR," claiming priority to European application no. EP17163387.8, filed Mar. 28, 2017, which are hereby expressly incorporated by reference as part of the present disclosure.

FIELD OF THE INVENTION

The present disclosure generally relates to a method for (fine) machining of a gear wheel workpiece. The present disclosure also relates to a gear wheel pair, in which at least one of the gear wheel workpieces was (fine) machined using this method.

BACKGROUND

In addition to the carrying capacity optimization, the optimization of the running and noise behavior of transmissions is an important goal in the design of gear wheels or of gear wheel pairs, respectively. The transmission noise plays an essential role in industrial transmissions, but certainly even more in automobile transmissions. Due to the expected increase in electric vehicles, the transmission noise will gain even more significance, since the electric motor introduces a comparatively low noise excitation into the drivetrain in relation to an internal combustion engine.

In the case of transmission noises, not only is the absolute volume, for example, the A-weighted sound pressure level, important, but rather also the psychoacoustic and/or subjective evaluation of the noise behavior. For example, the noise of a brook can be significantly louder with respect to its A-weighted sound pressure level than a car driving past and nonetheless the car noise is evaluated as significantly more unpleasant subjectively than the noise of the sound of the water.

Noise studies on motor vehicle transmissions have shown that in particular a tonal characteristic of the transmission noise is perceived as annoying. Tonal noises are characterized in that the frequency spectrum thereof has clearly pronounced amplitudes of individual frequencies (i.e., specific tones), which are above the amplitude level of the background noise. In the case of gear teeth, these are in particular the frequency of the tooth engagement and its higher harmonics, which essentially define the tonality of the transmission noise.

It has been established in noise studies on bevel gear teeth that the type of the hard-fine machining after the hardening of gear teeth could have an influence on the noise tonality thereof.

Figure 1A:
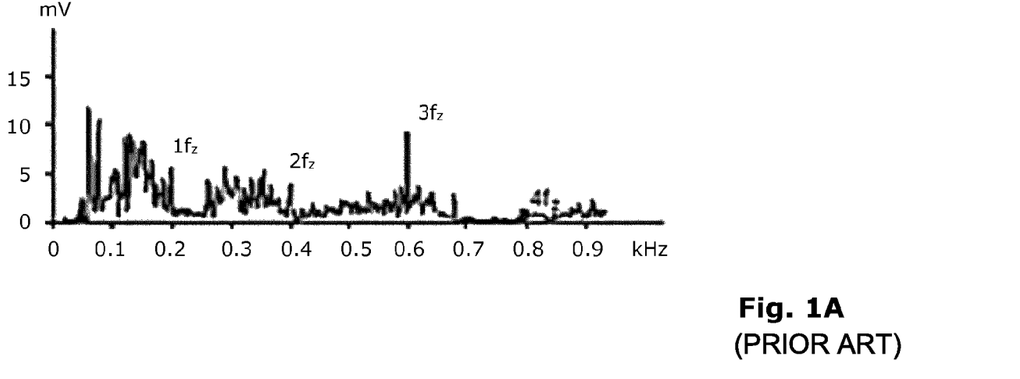
FIG. 1A schematically shows by way of example the structure-borne noise spectrum of a bevel gear pair, the gear wheels of which were fine-machined by lapping after the hardening.
Figure 1B:
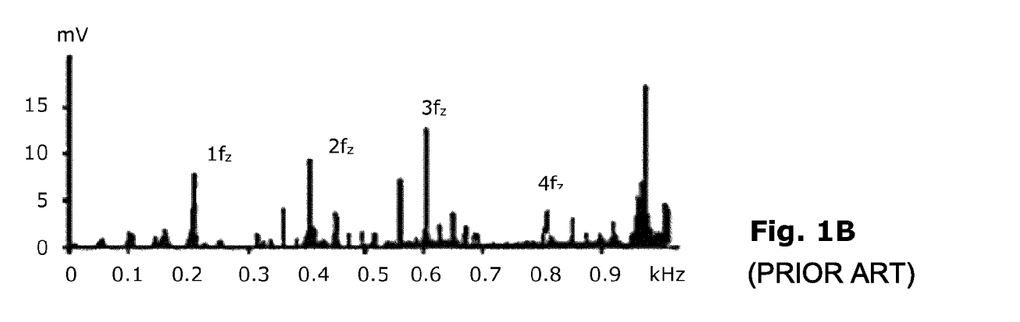
FIG. 1B schematically shows by way of example the structure-borne noise spectrum of a bevel gear pair, the gear wheels of which were fine-machined by grinding after the hardening.
Figure 1C:
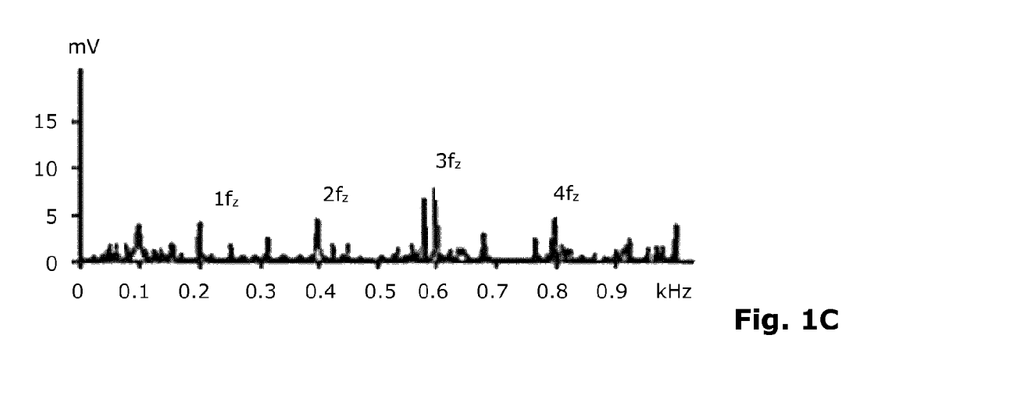
FIG. 1C schematically shows by way of example the structure-borne noise spectrum of a bevel gear pair, the gear wheels of which were fine-machined by grinding according to one embodiment after the hardening.

It can be seen from FIG. 1A that lapped gear teeth do also have individual frequencies having overelevated structure-borne noise amplitudes, but these do not stand out as clearly from the overall spectrum as in the conventionally ground gear teeth, the spectrum of which is shown in FIG. 1B.

It has been shown that by way of the formation of the ease-off topography of the bevel gear teeth, in principle the amplitudes of ground wheelsets which stand out from the overall spectrum can be reduced. However, the tonal characteristic of the noise is still maintained in this case.

It has now been possible to work out the causes for the different noise characteristics of the hard-fine machining methods in more extensive noise studies on bevel gear teeth on the basis of more detailed comparison measurements of various hard-fine machined gear teeth and with the aid of extensive accompanying studies.

One essential finding is that the gear teeth quality according to DIN with respect to indexing and concentricity is significantly less in the lapped wheelsets than that of hard-skived and ground gear teeth. Moreover, it has been possible to observe that the gear tooth geometry and the tooth flank topography of the lapped wheelsets varies significantly more strongly than that of the ground and hard-skived variants. If one thus decides for lapped gear teeth because of the somewhat better noise behavior, one thus acquires disadvantages in the matters of indexing and concentricity.

SUMMARY

Therefore, the object presents itself of seeking an improved approach for (fine) machining of bevel gears, which helps in this case to suppress the noises perceived as unpleasant or at least reduce the influence thereof on the overall noise behavior of a gear wheel pair.

In particular, the object therefore presents itself of finding an improved approach for optimizing the noise behavior of gear wheel pairs, in particular of bevel gear teeth, which is intended to reduce the noise component subjectively perceived as unpleasant, i.e., above all to suppress strong tonal noise components or at least reduce the influence thereof on the overall noise behavior of a transmission.

A method of at least some embodiments is provided using which the noise subjectively perceived as more pleasant of lapped bevel gears can be reproducibly simulated by means of other hard-fine machining methods, for example, grinding or hard skiving, although grinding and also hard skiving are processes which are significantly different than lapping.

At least some embodiments also relates to a gear wheel pair in which at least one of the gear wheel workpieces was (fine) machined using the method. Preferably, both gear wheel workpieces of such a gear wheel pair are machined using the present method.

It is to be noted at this point that the approach presented herein is transferable to any type of gear teeth, i.e., for example, it can also be applied in the noise optimization of spur gear or cycloid gear teeth. Therefore, reference is made hereafter to gear wheel workpieces in general.

According to at least some embodiments, optimized grinding machining and/or hard skiving machining and/or power skiving machining of the tooth flanks of bevel gears is used in the scope of the fine machining (also referred to as final machining after the hardening). In this case, this involves preventing periodically repeating "disturbances" of the tooth flanks or, if they occur in an intermediate step of the production, reducing them by such finish machining.

At least some embodiments preferably relate to a method for fine machining of a gear wheel workpiece or multiple gear wheel workpieces of a series, wherein the gear wheel workpiece comprises multiple tooth gaps, each defined by two tooth flanks, and wherein a gear cutting tool is used to provide at least one subset of all tooth flanks with a non-periodically distributed modification of the flank topography. This method is carried out in a multiaxis gear cutting machine and after the fine machining of the gear wheel workpiece, the following steps are carried out for at least a part of the tooth flanks:

carrying out a measurement to ascertain the actual topography of the tooth flank,     carrying out a computer-based comparison of the actual topography to the target topography, and, if the comparison shows that deviations exist between the actual topography and the target topography,     carrying out correction machining of at least a part of the tooth flanks of the gear wheel workpiece or, if multiple gear wheel workpieces are machined in series in the gear cutting machine, carrying out a correction machining of at least a part of the tooth flanks of a subsequent gear wheel workpiece of the series.

The advantage of the simulation attempted in this way of the lapped gear tooth geometry, preferably by means of grinding, but also using any other method for hard-fine machining or final machining of gear teeth (for example, hard skiving) is that due to the geometric accuracy of this hard-fine machining method, the machining result can be intentionally influenced in comparison to lapping and is thus reproducible.

The main goal in the optimization of the noise behavior of the gear wheel pairs by a modification of the gear tooth geometry in this case is the avoidance of any type of periodicities, and/or periodic geometric components are eliminated by targeted superposition of stochastic elements by way of the use of the invention.

The noise behavior and/or the subjective perception of the noise may be significantly improved by the avoidance or reduction of periodic patterns in the gear tooth geometry.

One essential effect of the method according to the invention is a rise of the background noise level, or respectively a reduction of the amplitudes of the tonal, respectively periodic noise components, for example, of the tooth engagement frequencies, in relation to the amplitudes of the background noise of the gear tooth noise.

Since in particular the noise excitation from the tooth engagement has a decisive influence on the noise behavior of gear teeth, a method is provided according to at least some embodiments in which, in the scope of the (hard) fine machining of the tooth flanks of at least one gear wheel workpiece of a gear wheel pair, a stochastically varying flank modification is laid at least over a part of all concave and/or convex tooth flanks. A stochastically varying flank modification is preferably laid over all concave and/or convex tooth flanks of at least one gear wheel workpiece of a gear wheel pair.

According to at least some embodiments, the target topography of at least one gear wheel workpiece of a gear wheel pair is thus adapted by stochastic, tooth-individual flank modifications, to ensure an ease-off in the tooth engagement with the second gear wheel of the gear wheel pair which is somewhat different in each tooth engagement than in the respective preceding tooth engagement.

It is important to understand that these tooth-individual flank modifications differ from the basic modifications of the tooth flanks, which are typically predetermined in the scope of the design. These basic modifications are identical for all tooth flanks, while in contrast the tooth-individual flank modifications vary in a stochastically distributed manner from tooth to tooth. Such basic modifications are predetermined in the scope of the design, for example, to take into consideration the displacement sensitivity of the two wheels of a gear wheel pair.

This means that according to at least some embodiments, all tooth engagements of a gear wheel pair are intentionally provided with an ease-off which has a non-periodic and/or stochastic distribution. Since the ease-off of a gear wheel pair results from the interaction and/or rolling of a flank topography of gear and counter gear, a stochastic distribution of the ease-off can be achieved by a stochastic, tooth-individual variation of the tooth flank topographies on one of the two gears or both gears. The tooth-individual variation of the tooth flank topographies can be performed in one of the two gears or in both gears, also only on a subset of the tooth flanks.

The production of such tooth flank topographies varying from tooth to tooth can be achieved either by a variation of the tool profile or by variation of the tool movement in relation to the tooth flank by means of influencing of the machine kinematics during the production or the (fine) machining of the tooth flank or by a combination of the variation of tool geometry and machine kinematics.

The ease-off basically defines or determines the interaction of the teeth of two meshing gears. The ease-off topography or function is the minimum of the contact distance of the tooth flanks when rolling the gears in the theoretically constant gear ratio that is defined by the number of teeth. The ease-off function for instance can be displayed as a 3-dimensional graph over the radial projection of the flank of one of the mating gears.

For the practical application, in all embodiments solely a variation of the machine kinematics is preferably used, since otherwise the geometry of the tool would have to be changed between the machining of each tooth gap, which would increase the machining time and the production costs greatly.

To be able to produce an aperiodic and/or stochastic tooth flank geometry (referred to here as tooth-individual variation of the tooth flank topography) from tooth flank to tooth flank by means of variation of the machine kinematics according to at least some embodiments, the so-called single-indexing methods for fine machining of gear teeth preferably suggest themselves.

The method according to at least some embodiments may generally also be applied to the continuous-indexing (hard-fine) machining methods of gear teeth, but this proves to be significantly more difficult as a result of the multiple engagements between tool and workpiece usually occurring in these methods, and/or has the risk that one will be very strongly restricted in the movement freedom and/or variation of the machine kinematics.

Upon application of the method according to at least some embodiments in the single-indexing method, the grinding of bevel gear teeth using cup-shaped grinding wheel or the profile grinding of cylinder wheel gear teeth using disk-shaped grinding wheel is preferably used in all embodiments. For the aperiodic and/or stochastic variation of the tooth flank geometry by means of machine kinematics, the basic kinematics between tool and workpiece, which are predetermined according to the main design of the gear teeth, can be produced by an overlaid additional movement of all machine axes. Which of the axes are preferably used is dependent on the individual axis structure of the gear cutting machine.

The aperiodic and/or stochastic variation of the tooth flank geometries is reasonably to be executed in all embodiments in such a way that the amplitudes of the rotational error of the main design are only modified as much as is necessary for generating the effect of background noise amplification. Furthermore, it is to be ensured that jumps in the curve of the rotational error do not result in the transition between the individual tooth engagements, since such discontinuities result in a pulsing noise excitation and can generate a subjectively unpleasant noise.

According to at least some embodiments, inter alia, a method is provided in which in the scope of the fine machining—preferably in the scope of the hard-fine machining—of the concave and/or convex tooth flanks of a gear wheel workpiece, a stochastically varying topography adaptation is laid over all tooth flanks. This means, in all embodiments, all tooth engagements of a gear wheel pair are preferably provided with an ease-off which has a nonperiodic distribution.

In all embodiments, based on an established main topography of gear teeth and/or the ease-off of the wheelset, a tooth-individual topography variation is preferably performed, which differs from tooth to tooth, to produce a wheelset which has a reduced tonal noise generation in relation to a topography identical for each flank.

This variation is preferably performed in all embodiments without change of the tool profile, but rather solely by a targeted movement adaptation (by the specification of a stochastically distributed additional movement here) of the tool in relation to the tooth flanks of the pre-cut gear wheel workpiece.

The method of at least some embodiments may be applied to gear wheel workpieces after the hardening. This method is therefore also referred to as a method for optimized hard-fine machining.

It is an advantage of the method of at least some embodiments that due to the use of the optimized grinding and/or hard-skiving machining, the oscillation and noise excitation of the tooth engagement of a gear wheel pair can be reduced or at least subjectively improved.

It is an advantage of at least some embodiments that because of the stochastic distribution of the topography variation, the mean values (for example, of the pressure angle, spiral angle, the torsion, the vertical and longitudinal crowning) of the finished machined gear wheel workpiece, if these are measured over all teeth, display no or almost no changes in relation to gear wheel workpieces which were not fine machined.

According to at least some embodiments, the optimized grinding machining is preferably used after the soft gear cutting and the subsequent heat treatment (hardening).

This summary is not exhaustive of the scope of the present aspects and embodiments. Thus, while certain aspects and embodiments have been presented and/or outlined in this summary, it should be understood that the present aspects and embodiments are not limited to the aspects and embodiments in this summary. Indeed, other aspects and embodiments, which may be similar to and/or different from, the aspects and embodiments presented in this summary, will be apparent from the description, illustrations, and/or claims, which follow.

BRIEF DESCRIPTION OF THE DRAWINGS

Exemplary embodiments of the invention, which are understood not to be limiting, are described in greater detail hereafter with reference to the drawings.

DETAILED DESCRIPTION

Terms are used in conjunction with the present description which are also used in relevant publications and patents. However, it is to be noted that the use of these terms is merely to serve for better comprehension. The inventive concepts and the scope of protection of the claims for protection are not to be restricted in the interpretation by the specific selection of the terms. The details presented herein may be readily transferred to other term systems and/or technical fields. The terms are to be applied accordingly in other technical fields.

The details presented herein may be applied, for example, to the single-indexing method, as mentioned at the outset. Therefore, details in this regard are described in conjunction with FIGS. 2A and 2B.

Figure 2A:
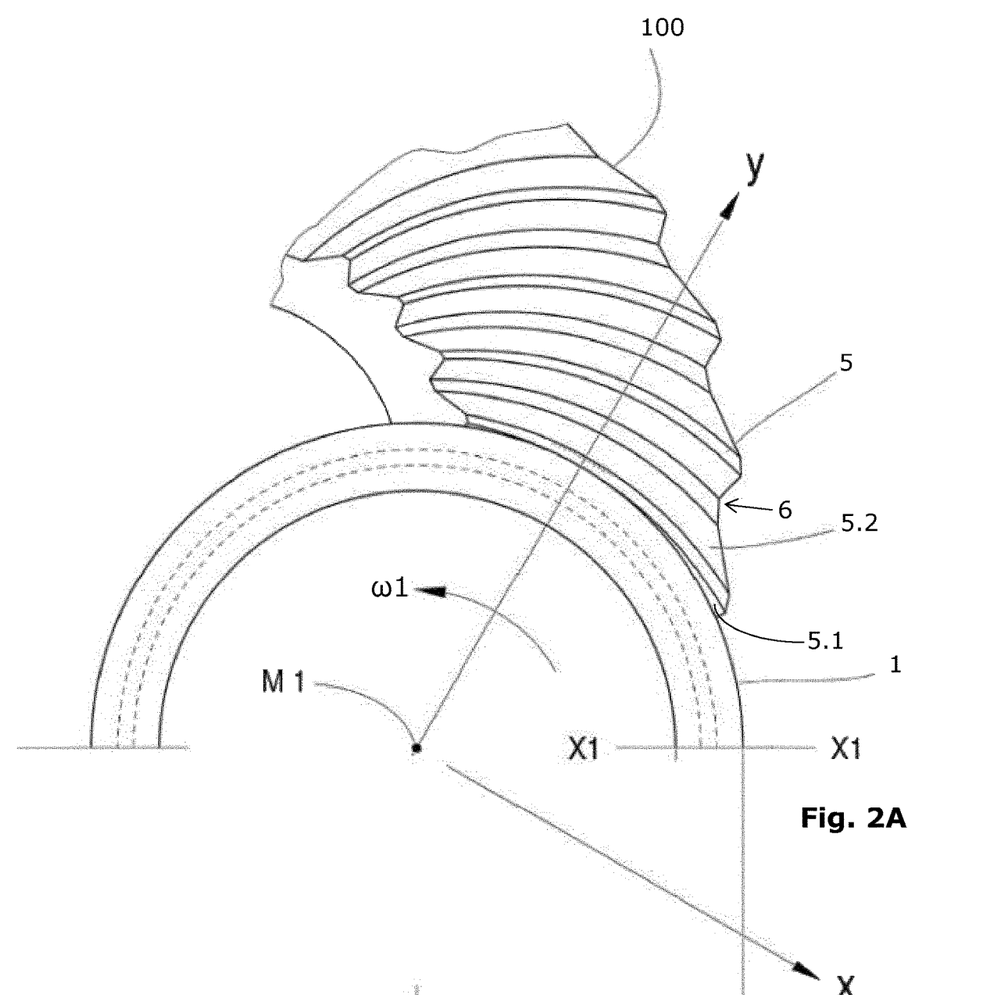
FIG. 2A shows a very schematic view of a cup grinding wheel, which is mounted in a known manner and machines a concave flank of a tooth gap of a crown gear workpiece.

FIG. 2A shows a schematic illustration of one approach, in which a grinding tool 1 (a cup grinding wheel 1 here) rotates around a wheel center point M1. The axis of rotation R1 of the tool spindle (not shown) is perpendicular to the plane of the drawing and extends through the wheel center point M1. The rotation of the cup grinding wheel 1 around the axis of rotation R1 is identified in FIG. 2A with ω1. The corresponding axial drive is referred to hereafter by A1. At the moment shown, a concave tooth flank 5.1 of a tooth 5 of the gear wheel workpiece 100 is being ground. A convex tooth flank is identified by the reference sign 5.2. In each case one concave tooth flank 5.1 and one convex tooth flank 5.2 define a tooth gap 6.

Figure 2B:
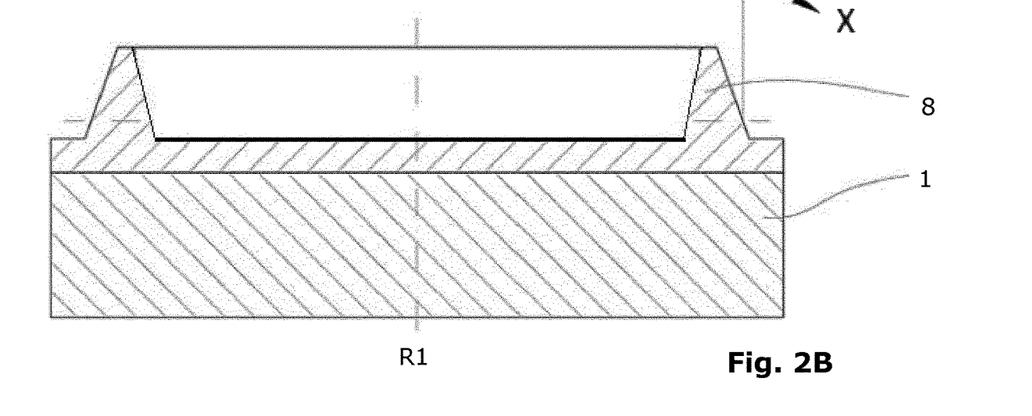
FIG. 2B shows a very schematic sectional view of the cup grinding wheel according to FIG. 2A along section line X1-X1.

FIG. 2B shows a schematic simplified section along line X1-X1 through a part of the cup grinding wheel 2, wherein none of the roundings of the corners, which are necessary in practice and are also provided, are shown. The profile 8 of the cup grinding wheel 1 can be seen in FIG. 2B. The outer flank on the outer circumference of the cup grinding wheel 1 is used to grind the concave tooth flanks 5.1 of the workpiece 100. The inner flank on the inner circumference of the cup grinding wheel 1 is used to grind the convex tooth flanks 5.2 of the workpiece 100.

A substep of the hard-fine machining of a gear wheel workpiece 100 can be seen in principle in FIG. 2A, wherein the overlay or the specification of a stochastically distributed additional movement cannot be made visible in this static illustration.

The method details presented herein is preferably used in all embodiments in a gear wheel grinding machine or in a hard-skiving machine, wherein the controller 50, or a software module, or software SW ensures the specification of the stochastically distributed additional movement. Reference is made here in general to multiaxis gear cutting machines 20, wherein CNC-controlled machines 20 are preferably used in all embodiments.

Figure 3:
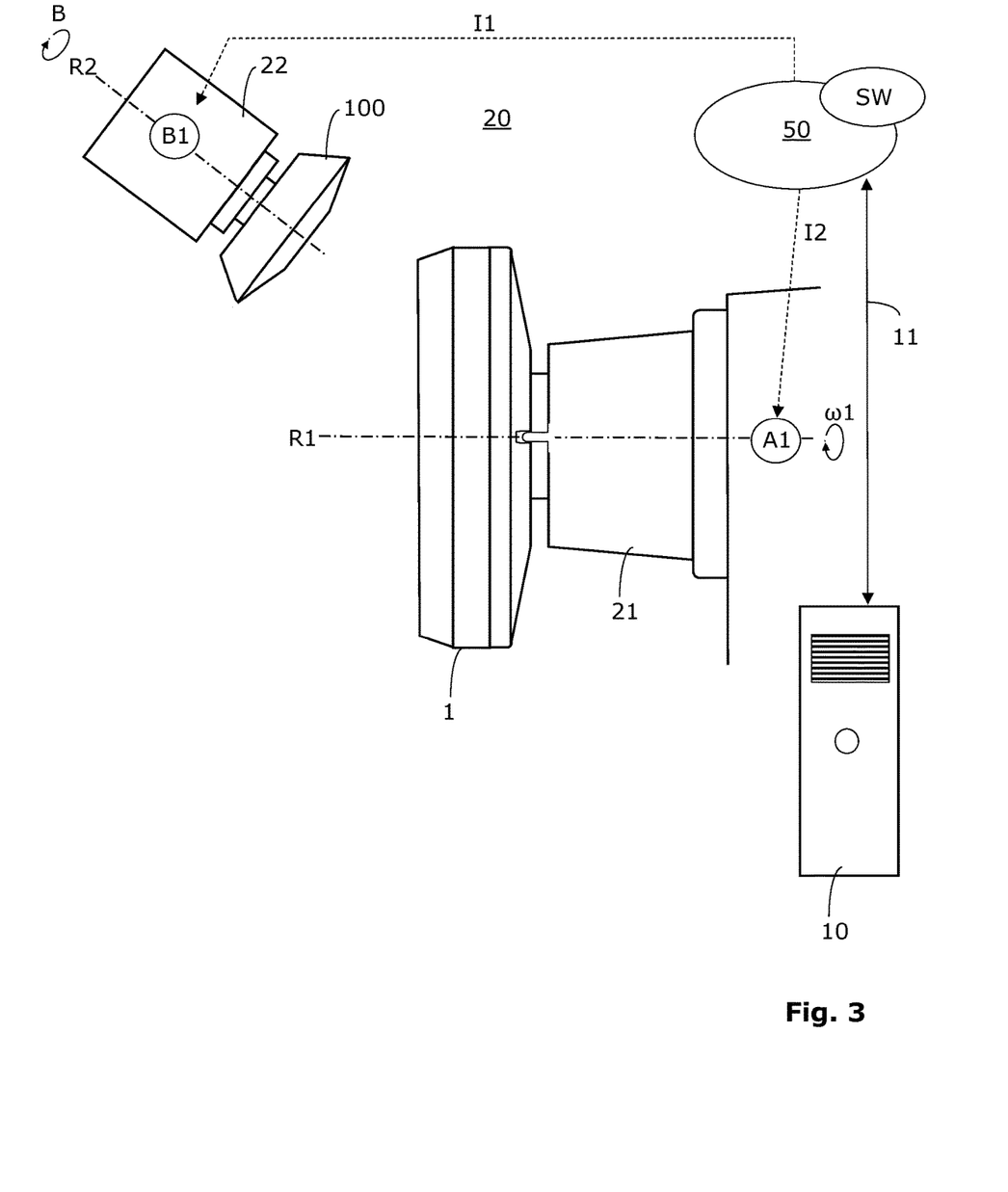
FIG. 3 shows a schematic view of a part of a first grinding machine according to an embodiment having a cup grinding wheel, which is rotatably mounted on a tool spindle, and having a bevel gear workpiece to be machined, which is rotatably mounted on a workpiece spindle, wherein at the moment shown, the cup grinding wheel and the bevel gear workpiece are not engaged.
Figure 4:
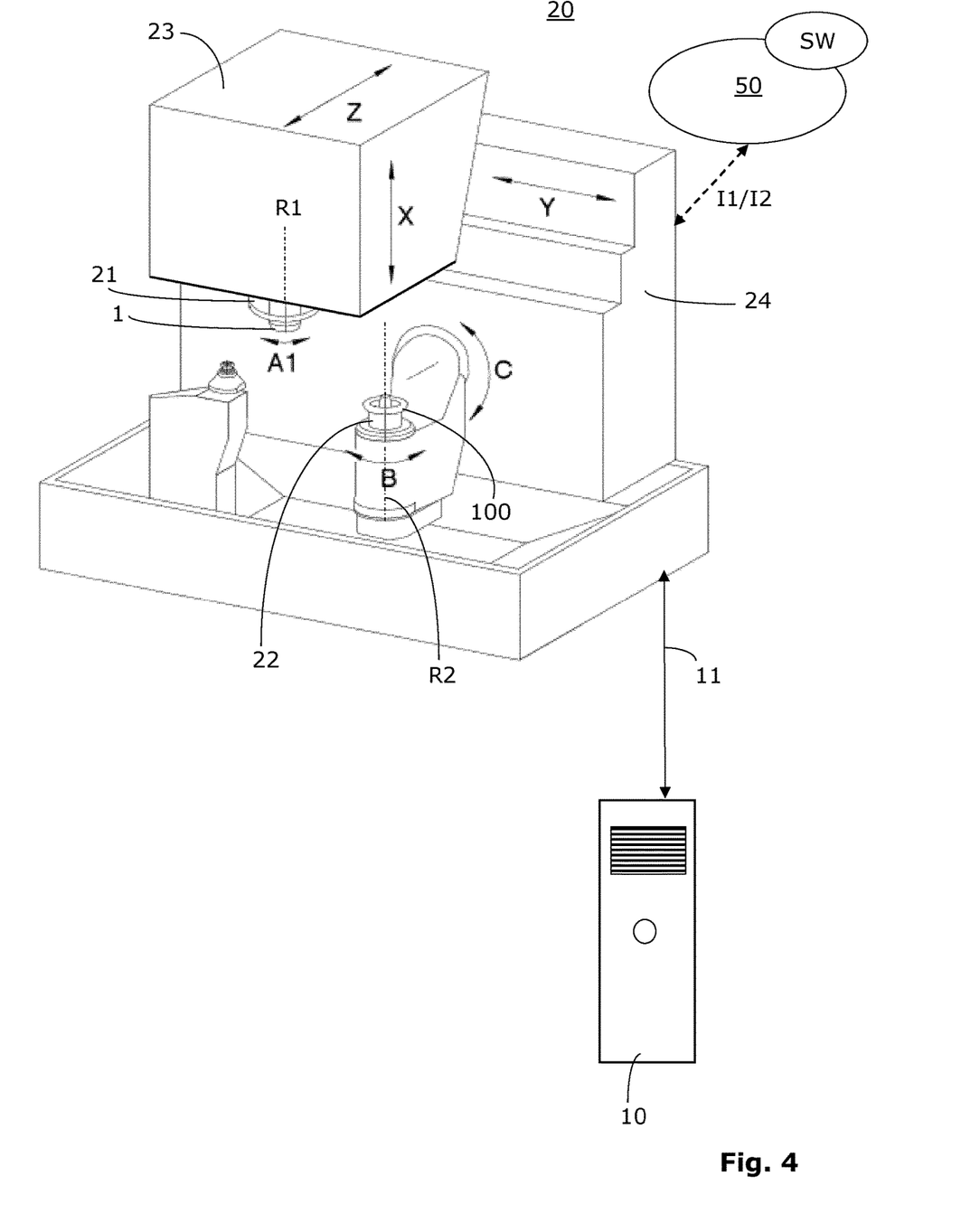
FIG. 4 shows a simplified perspective view of a second grinding machine according an embodiment having a cup grinding wheel arranged in a hanging manner, which is rotatably mounted on a tool spindle, and having a bevel gear workpiece to be machined, which is rotatably mounted on a workpiece spindle, wherein at the moment shown, the cup grinding wheel and the bevel gear workpiece are not engaged.

Gear cutting machines 20, which are equipped for grinding, are shown in FIGS. 3 and 4. These gear cutting machines 20 can also be equipped differently.

A gear cutting machine 20 details presented herein comprises, for example, as schematically shown in FIG. 3, a workpiece spindle 22, which is designed to accommodate a bevel gear workpiece 100 (in the form of a crown gear shown stylized here). In addition, it comprises a tool spindle 21 for accommodating a grinding tool 1 (in the form of a cup grinding wheel 1 here) and multiple drives (e.g., A1, B1, and further drives, which are not shown in the figures) for machining the bevel gear workpiece 100 using the grinding tool 1. During the (fine) machining of the bevel gear workpiece 100, the grinding tool 1 executes a rotation ω1 around the axis of rotation R1 of the tool spindle 21. The corresponding axial drive is identified with A1, as already mentioned in conjunction with FIG. 2A. The grinding tool 1 engages in the bevel gear workpiece 100, for example, as shown in FIG. 2A on the basis of a spiral-toothed crown gear, to remove material in a targeted manner in the scope of the (fine) machining.

Since this exemplary embodiment relates to a so-called single-indexing grinding method, the bevel gear workpiece 100 executes an indexing rotation B around the axis of rotation R2 after each machining of a flank of a tooth gap. It is thus a discontinuous method. Thus, for example, all concave flanks 5.1 of all teeth 5 are (fine) machined step-by-step (see FIG. 2A). Furthermore, a CNC controller 50 is shown, which is designed to control the movement sequences in the machine 20, as indicated by the control signals I1, I2.

Furthermore, a computer 10 can be provided in all embodiments, which is especially designed (programmed) to apply the present method. The computer 10 has a communication connection to the machine 20 and/or the controller 50, as indicated in FIG. 3 by the connection 11. The computer 10 does not necessarily have to be embodied as a complete computer in all embodiments. A computer module, a chip module, or a plug-in card having processor or the like can also be used in all embodiments. The computer 10 can also be part of the controller 50, or the controller 50 can be part of the computer 10, in all embodiments.

FIG. 4 shows a perspective view of a second grinding machine 20 having a cup grinding wheel 1 arranged in a hanging manner, which is rotatably mounted on a tool spindle 21, and having a bevel gear workpiece 100 to be machined, which is rotatably mounted on a workpiece spindle 22, wherein the cup grinding wheel 1 and the bevel gear workpiece 100 are not engaged at the moment shown. The statements which were previously made with reference to the computer 10 are also to be applied here.

The single-spindle grinding machine 20 shown by way of example in FIG. 4 furthermore comprises a tool carriage 23, which is mounted so it is displaceable on a machine stand 24 parallel to the linear axis Y and to the linear axis Z. The machine 20 comprises a further linear axis, which is referred to as the X axis. In addition, this machine 20 comprises a pivot axis C, which enables pivoting of the workpiece spindle 22 together with workpiece 1. Furthermore, a CNC controller 50 is shown, which is designed to control the movement sequences in the machine 20, as indicated by the control signals I1, I2. A computer 10 can also be a part of the controller 50, or the controller 50 can be part of a computer 10, in this embodiment.

The single-spindle grinding machine 20 of FIG. 4 is especially designed for grinding spiral-toothed bevel gears. The present can be implemented particularly advantageously in this machine 20.

By way of the use of a suitable controller 50 and/or suitable software or a software module SW, the geometric accuracy of the hard-fine machining method (for example, of the grinding or the hard-skiving) can intentionally influence the machining result in comparison to lapping. The hard-fine machining thus becomes reproducible and is therefore also suitable above all for the fine machining in the series production of gear wheels and gear wheel pairs.

The noise behavior of gear wheels and gear wheel pairs is improved by the controller 50 and/or by suitable software or by a software module SW by the targeted change of the gear tooth geometry, wherein this is achieved by the avoidance of interfering periodicities. This means that periodic geometry components are eliminated by overlay of stochastic elements in all embodiments.

Due to the avoidance or due to the reduction of periodic patterns in the gear tooth geometry, the noise behavior and/or the subjective perception of the noise may be significantly improved.

The method presented herein is based, inter alia, on raising the background noise level, wherein a reduction thus occurs of the amplitudes of the tonal or periodic noise components, respectively, for example, the tooth engagement frequencies, in relation to the amplitudes of the background noise of the gear tooth noise.

The production of such tooth flank topographies varying from tooth to tooth can be achieved either by a variation of the tool profile (for example, of the profile 8 of a cup grinding wheel 2) or by a variation of the tool movement in relation to the tooth flank of the gear wheel workpiece by means of influencing of the machine kinematics during the production or finish machining of the tooth flank. However, a combination of the variation of tool geometry and machine kinematics can also be used in all embodiments.

For the practical application, solely a variation of the machine kinematics is used, as already described at the outset.

Preferably, only the machine axes which are already used in the basic kinematics to produce the geometry according to the main design, or which are used in any case during the conventional fine-hard machining, are used in at least some embodiments.

The method may especially be used for machining a gear wheel workpiece 100, which comprises multiple tooth gaps 6, which are each defined by two tooth flanks 5.1, 5.2 (see FIG. 2A). One gear cutting tool 1 is always used to provide at least a subset of all tooth flanks 5.1, 5.2 with a non-periodically distributed modification of the flank geometry.

For example, all concave tooth flanks 5.1 and/or all convex tooth flanks 5.2 can be machined or finish machined.

For example, all concave tooth flanks 5.1 of a subset of the tooth flanks and/or all convex tooth flanks 5.2 of a subset of the tooth flanks can be machined or finish machined.

The method may preferably be used on a multiaxis gear cutting machine 20, as shown by way of example in FIGS. 3 and 4. By way of the use of a CNC controller 50 of the gear cutting machine 20, a relative movement in relation to the tooth flanks 5.1, 5.2 is predetermined for the tool 1, which is spatially and chronologically varied in such a way that at least each tooth flank 5.1, 5.2 of the subset of the tooth flanks receives a minimally different flank geometry in relation to a subsequent tooth flank of this subset.

Preferably, before the execution of the method, for example, in the scope of a design of the gear teeth, the tooth contact between the gear wheel workpiece 100 and a further gear wheel workpiece to be paired therewith is ascertained by computer by the use of software or a software module SW. The non-periodically distributed modification of the tooth contact is then predetermined for the contact of each tooth flank of the gear wheel workpiece 100 with each counter flank of the further gear wheel workpiece 1.

The method can be restricted in all embodiments to only the traction side of all or a part of all of the teeth. In addition, however, the method can also be applied in all embodiments to the thrust side.

The non-periodically distributed modification can be ascertained in all embodiments, for example, by means of flank generator software, before the method for (fine) machining is executed.

The machining is preferably executed in all embodiments so that an effective instantaneous transmission ratio, which does not have any periodically repeating oscillation components, results for a pairing of the gear wheel workpiece 100 with a second gear wheel workpiece.

Parameters of the gear teeth which are to be varied, and variation limits for each parameter, are preferably defined in all embodiments. To be able to produce the varied topographies of the tooth flanks without changing the tool profile, a restriction to the parameters of pressure angle and spiral angle suggests itself for crown gears which are produced in the plunging method.

Examples of the parameters and the variation limits thereof are indicated on the basis of the subsequent table:

| Parameter | Pinion | Crown gear |
| --- | --- | --- |
| Pressure angle | ±0.020° | ±0.020° |
| Spiral angle | ±0.005° | ±0.005° |
| Vertical crowning | ±0.004 mm | — |
| Longitudinal crowning | ±0.006 mm | — |
| Torsion | ±0.030° | — |

It can be seen on the basis of this exemplary table that during the fine machining of the tooth flanks of crown gears produced in the plunging method, the pressure angle can be changed in the range of plus/minus 0.02° and the spiral angle can be changed in the range of plus/minus 0.005°. This means that numerous various modifications of the tooth flanks, which do not periodically repeat, may be defined within these variation limits.

Individual parameter combinations, which each define a topography variant, are established within the variation limits of the individual parameters. The establishment can be performed randomly, for example.

As can be inferred from the table, in the case of pinions which are fine machined, in addition to the pressure angle and the spiral angle, the vertical crowning and/or the longitudinal crowning and/or the torsion can also be used for the variation of the flank topography, since the pinions are not machined by plunging in the single indexing method.

In the case of rolled crown gears, variations similar to pinions are possible.

Figure 5A:
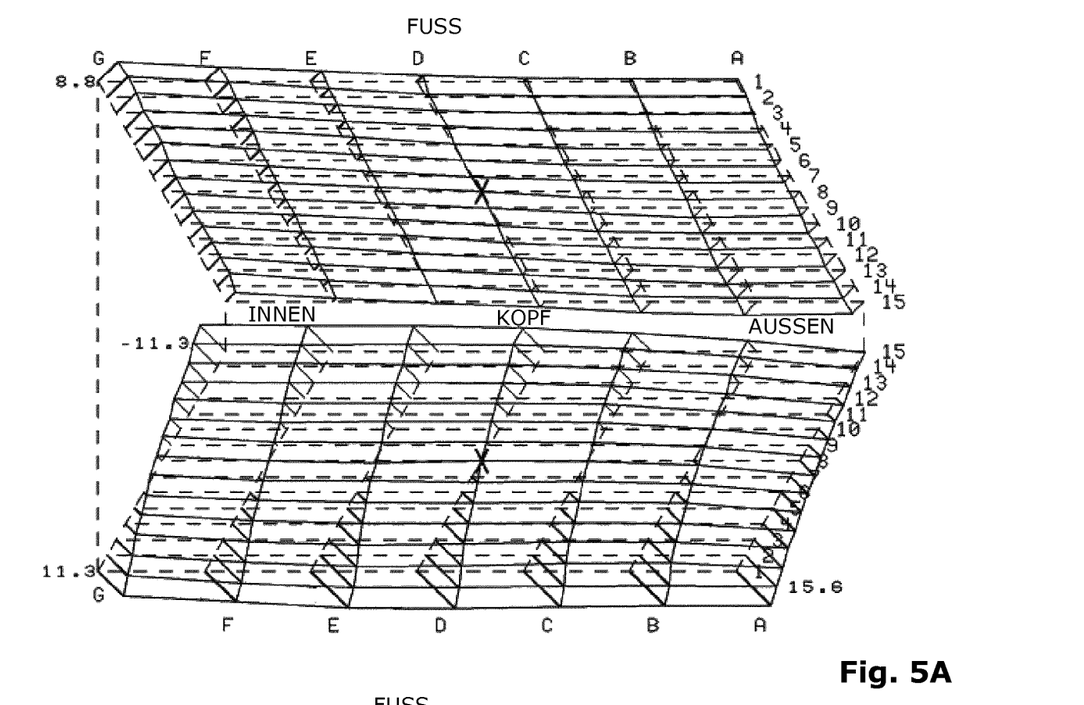
FIG. 5A schematically shows by way of example the actual topography of the tooth flanks of a first tooth of a gear wheel workpiece (a pinion here) in relation to the target topography of this first tooth, wherein this target topography has basic modifications.

FIG. 5A schematically shows by way of example the actual topography of the tooth flanks of a first tooth of a gear wheel workpiece 1 (a pinion here) in relation to the target topography of this first tooth, wherein this is the target topography having basic modifications here.

Figure 5B:
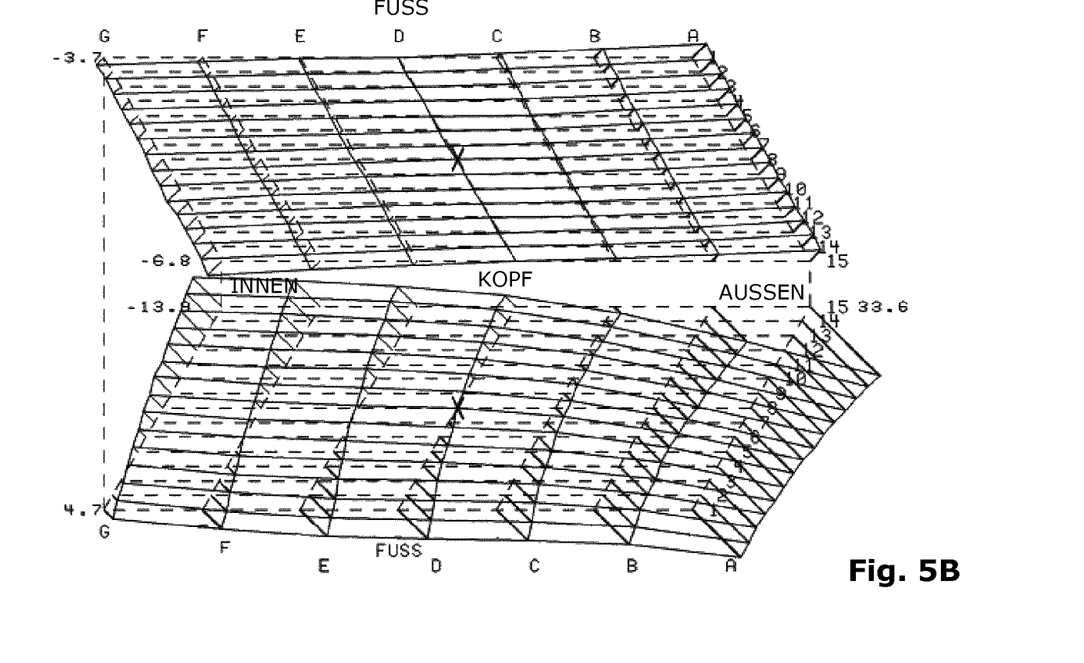
FIG. 5B schematically shows by way of example the actual topography of the tooth flanks of a further tooth of the bevel gear workpiece (a pinion here) in relation to the target topography of this further tooth, wherein this target topography has basic modifications.

FIG. 5B schematically shows by way of example the actual topography of the tooth flanks of a further tooth of the gear wheel workpiece 1 of FIG. 5A in relation to the target topography of this further tooth, wherein this is the target topography having basic modifications here.

To be able to illustrate the stochastic distribution of the flank modifications, actually more than only two teeth of a correspondingly modified gear wheel workpiece 1 have to be shown. However, since an illustration according to FIGS. 5A and 5B of numerous teeth would not provide any important content—except for the fact that, for example, all convex tooth flanks differ from one another, an illustration of all tooth flanks and the measurements was omitted here. A person skilled in the art is readily capable of also transferring the statement on FIGS. 5A and 5B to further tooth flanks.

In the example shown in FIGS. 5A and 5B, the flank modification is primarily concentrated on the convex tooth flanks, which are each shown in the lower image half. The concave tooth flanks (each shown in the upper image half) are nearly identical here in the first tooth in FIG. 5A and the further tooth in FIG. 5B.

The graphics of FIGS. 5A and 5B are based on a measurement which was carried out in the machine 20 without re-chucking the gear wheel workpiece 1. Overall, the actual topography of the tooth flanks was measured after the fine machining on 7×15 points. For this purpose, the flanks were divided into 7 columns A to G and into 15 lines 1-15. The actual values of the actual topography are plotted in each point of the 7×15 grid as the normal to the target plane. The more strongly the actual value deviates from the target value (target topography of the flank having basic modification), the longer are these normals.

On the left, exemplary numeric values are applied adjacent to the convex tooth of FIG. 5A. At the point (G, 1) of the grid, the corresponding tooth is 11.3 μm thicker than the target value. The point (G, 1) is located on the inside on the gear wheel workpiece 1 directly in the vicinity of the base. At the point (G, 15) of the grid, the corresponding tooth is 11.3 μm thinner (therefore −11.3 in FIG. 5A) than the target value. The point (G, 15) is located on the inside on the gear wheel workpiece 1 directly in the vicinity of the head.

Correspondingly, exemplary numeric values are also applied on the left adjacent to the convex tooth of FIG. 5B.

At the point (G, 1) of the grid, the corresponding tooth is 4.7 µm thicker than the target value. At the point (G, 15) of the grid, the corresponding tooth is 13.9 µm thinner (therefore −13.9 in FIG. 5B) than the target value.

It can already be seen from these exemplary numbers that the convex tooth flank of the first tooth differs from the convex tooth flank of the further tooth.

As already mentioned, at least the tooth flanks on the traction side of the teeth are preferably occupied during the fine machining with a statistically distributed flank modification in all embodiments.

If both the traction side and also the thrust side of the flanks are stochastically changed, it is thus to be ensured that the values for the two flanks of a tooth gap are equal in absolute value, wherein they have the same sign for the spiral angle and the longitudinal crowning and they have opposite signs for the pressure angle, the vertical crowning, and the torsion, in order to enable an optimum production capability without change of the tool profile.

The number of the topography variants is preferably less than or equal to the number of teeth of the respective gear wheel workpiece in all embodiments. If the number is less than the number of teeth (for example, 10 variants with 45 teeth), it thus has to be established for the individual tooth gaps which variant is used. This establishment can be performed randomly in all embodiments.

For each topography variant, machine settings (if only small changes of the machine settings are used) and possibly the tool geometry data (if changes of the tool geometry are also used) are preferably ascertained as absolute values or difference values in relation to the basic design, using which they can be produced, in all embodiments. The topography variant can possibly only be approximated in this case. The individual tooth gaps of the gear wheel workpieces are produced according to these individual machine settings and possibly tool geometry data.

Based on the individual machine settings and possibly tool geometry data, the individual single tooth target topography is preferably defined in all embodiments for each topography variant.

To make the method of the fine machining more reproducible and robust, individual, multiple, or all tooth gaps are preferably measured in the machine tool 20 against the individual target topographies (called single tooth target topography) in all embodiments. If they become necessary, corrections of the machine settings of the machine tool 20 and possibly of the tool geometry data are then carried out as follows:

individually for single tooth gaps or multiple tooth gaps having identical target topography to adapt these tooth gaps to the fundamental target topography,     based on the deviations of single, multiple, or all tooth gaps in relation to the respective individual target topography as generally-valid correction to adapt all single topographies to the respective target topographies.

The method of at least some embodiments preferably comprises the subsequent steps in all embodiments:

establishing a basic topography of all concave and/or convex tooth flanks of a gear wheel workpiece 1,     establishing a topography variation, e.g.,         by loading previously stored specifications,         by selecting (for example, on a computer 10) a suitable, previously defined topography variation,         by the computer-assisted determination of a topography variation,         by the definition of parameters and/or variation limits and the computer-assisted application of an algorithm     computing/providing the individual target topographies of a part or all tooth flanks,     computing/providing the corresponding machine kinematics and possibly changed tool data for topography of the tooth flank(s) of the part or all gaps,     fine machining of the part or all tooth flanks (for example, by grinding),     measuring—preferably within the machine tool 20 without re-chucking the gear wheel workpiece 1—the current flank topographies against the individual target topographies, for example, to be able to ascertain deviations which are outside tolerances,     if necessary, for example, because the actual topography of a flank is outside the tolerance in relation to the individual target topography, carrying out a correction machining of at least this one flank in the machine tool 20 without re-chucking the gear wheel workpiece 1.

It is to be noted here that at least a part of the preceding steps which were described above can also be executed in a different sequence. Thus, for example, in one substep, the machine kinematics can be provided or computed to then be able to determine the individual target topographies in a subsequent substep based on these machine kinematics. The individual target topographies which were determined from the machine kinematics can then be machined exactly in the machine 20.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

The invention claimed is:

1. A method comprising: fine machining with a multiaxis gear cutting machine a gear wheel workpiece comprising multiple tooth flanks and multiple tooth gaps, each tooth gap defined by a respective left flank and a respective right flank of said tooth flanks, wherein said fine machining includes performing a non-periodically distributed modification of flank topography of at least a subset of said tooth flanks using a gear cutting tool, wherein the at least a subset of said tooth flanks comprises a plurality of left flanks or a plurality of right flanks, the method further including     assigning an individual different target topography to each tooth flank of the at least a subset of said tooth flanks, wherein, after performing the non-periodically distributed modification of the flank topography, each tooth flank of the at least a subset of said tooth flanks defines a different topography than all other tooth flanks of the at least a subset of said tooth flanks,     measuring actual topography of each of at least a plurality of tooth flanks of the at least a subset of said tooth flanks after said fine machining,     comparing, using a computer, for said each of said at least a plurality of tooth flanks, the actual topography thereof to the respective individual different target topography thereof and, in turn, determining any deviations between the actual topography and the respective individual target topography, and when one or more deviations exist, one or more of:
   performing a correction machining process on at least a portion of the respective tooth flank, or
   when said gear wheel workpiece is of a series of gear wheel workpieces fine machined in the gear cutting machine, performing said correction machining process on respective tooth flanks of at least one other gear wheel workpiece in the series.

2. The method according to claim 1, wherein said method defines a single-indexing method.

3. The method according to claim 1, further comprising predetermining a spatially and chronologically varied relative movement of the gear cutting tool relative to the tooth flanks of the at least a subset of said tooth flanks using a CNC controller of the gear cutting machine so that one or more of:
   (i) for each convex tooth flank of the at least a subset of said tooth flanks, said fine machining generates a different flank topography than a subsequent convex tooth flank of the at least a subset of said tooth flanks, or
   (ii) for each concave tooth flank of the at least a subset of said tooth flanks, said fine machining generates a different flank topography than a subsequent concave tooth flank of the at least a subset of said tooth flanks.

4. The method according to claim 1, further comprising using a software program or a software module in the multiaxis gear cutting machine before the fine machining step,
   determining, with a computer, a tooth contact between the gear wheel workpiece and a second gear wheel workpiece to be paired therewith, and
   determining a non-periodically distributed modification of the tooth contact for the contact of each tooth flank of the gear wheel workpiece with a conjugated tooth flank of the second gear wheel workpiece.

5. The method according to claim 1, further comprising, before the fine machining step, determining the non-periodically distributed modification using flank generator software.

6. The method according to claim 1, wherein the fine machining step includes machining the at least a subset of said tooth flanks so that, when the gear wheel workpiece is paired and operated with a second gear wheel workpiece, an effective torque transmission thereof has a reduced periodic excitation compared with operation of a pairing of said gear wheel workpiece and the second gear wheel workpiece on which said fine machining step has not been performed.

7. The method according to claim 1, wherein the fine machining step includes machining the at least a subset of said tooth flanks so that, when the gear wheel workpiece is paired and operated with a second gear wheel workpiece, an effective instantaneous transmission ratio thereof is free of periodically repeating oscillation components.

8. The method according to claim 1, wherein one or more of the fine machining step or the correction machining process includes generating tooth flank profiles of the at least a subset of said tooth flanks configured for pairing of the gear wheel workpiece with a second gear wheel workpiece with intermeshing tooth flank profiles wherein each engagement of a tooth flank of the gear wheel workpiece with a flank of the second gear wheel workpiece differs from an engagement of a subsequent tooth flank of the gear wheel workpiece with a subsequent flank of the second gear wheel workpiece.

9. The method according to claim 1, defining a grinding method or a hard-skiving method.

10. The method according to claim 1, wherein at least a portion of the measuring step is performed with the gear wheel workpiece in the gear cutting machine.

* * * * *